UNITED STATES PATENT OFFICE.

ROBERT S. FORBES, OF NEW YORK, ASSIGNOR TO WATER REPELLANT FINISHING COMPANY, OF NEW YORK, N. Y.

RENDERING GOODS AND FABRICS WATER-PROOF.

SPECIFICATION forming part of Letters Patent No. 298,366, dated May 13, 1884.

Application filed August 29, 1883. (No specimens.)

*To all whom it may concern:*

Be it known that I, ROBERT S. FORBES, of the city, county, and State of New York, have invented new and useful Improvements in Rendering Goods and Fabrics Water-Repellent, of which the following is a full, clear, and exact description.

The object of my invention is to provide certain new and useful improvements in treating goods and fabrics for the purpose of making them water-repellent and impervious to water.

In carrying out my invention I dissolve ozocerite, paraffine, or other mineral or vegetable wax in naphtha of 72° specific gravity at a temperature of 110° Fahrenheit, or in any other suitable light hydrocarbon. The proportion is about three ounces of ozocerite or paraffine or vegetable wax to one gallon of naphtha; or one-eighth of an ounce of vegetable wax and two and three-fourths ounces of ozocerite or paraffine can be dissolved in one gallon of naphtha. The ozocerite, vegetable-wax, &c., is cut very finely, and remains in the naphtha over night or until it is completely dissolved. The mixture is then agitated by forcing air into it, and then one gallon of sulphuric acid is added for every one hundred gallons of naphtha. The sulphuric acid bleaches the mixture. The mixture is then further agitated very thoroughly for about twenty-five minutes, or until the acid has spent its force and the liquid is perfectly colorless. Then the mixture is allowed to settle, and the refuse or surplus acid and the deposit are drawn off from the bottom. The mixture is then washed with water having a temperature of about 90°. The mixture is then allowed to settle, the water settling at the bottom, and is drawn after about forty minutes. The mixture is again washed with hot water of about 120° Fahrenheit, and agitated for about twenty minutes by forcing air into it. It is then allowed to settle for about forty-five minutes, and then the water is drawn off. These washings should be repeated until all traces of surplus acid are removed from the mixture. One gallon of an alkaline solution of caustic soda is added for each one hundred gallons of the mixture. The new mixture is agitated and allowed to settle over night. The alkali neutralizes the acid, and then the alkali is drawn off, and the mixture can be applied to the goods. A quantity of the solution is poured into a lead-lined tank having a wooden crate on the bottom, and the goods, fabrics, &c., that are to be rendered water-proof are placed in this solution, and are kept in the same for about five minutes, (more or less,) and are then taken out and placed in a drying-room, the temperature in which should not exceed 80° Fahrenheit. After about two hours the temperature is raised to about 140° Fahrenheit, and the goods are exposed to this heat for about two hours or longer. The goods are thus saturated with the above-described solution, and are made water-repellent; but the solution is not fixed in the goods, and they have a very strong and disagreeable odor, caused by the naphtha or other hydrocarbon in which the paraffine, &c., is dissolved; and it is now desirable to remove this odor, and also fix the mixture or solution.

To remove the odor and cause the mixture or solution to be thoroughly united with and fixed on the fibers of the goods, after having been soaked in the solution and then dried, they are subjected to action of dry steam in a suitable steam-box.

I am thus enabled to finish the goods very rapidly, as the steam removes the odors and "fixes" the waterproofing compound or solution in a very short time.

Having thus described my invention, what I claim as new, and desire to secure by Letters Patent, is—

1. The process of making goods and fabrics water-proof, consisting in soaking them in a waterproofing solution, drying, and then steaming them, substantially as herein described, whereby the waterproofing solution is fixed on the fibers and the odor is removed, as set forth.

2. The herein-described improvement in making goods and fabrics water-proof, consisting in subjecting the goods treated with a waterproofing compound or solution to the action of dry steam, substantially as herein shown and described.

3. The herein-described solution for making goods and fabrics water-proof, consisting of a vegetable or mineral wax or paraffine, or a mixture of the same, dissolved in a light hydrocarbon, then subjected to the action of sulphuric acid, and then washed, substantially as herein described.

4. The herein-described solution for making goods and fabrics water-proof, consisting of a vegetable or mineral wax or paraffine, or a mixture of the same, dissolved in a light hydrocarbon, then subjected to the action of sulphuric acid mixed with it, and then washed and neutralized by means of an alkaline solution, substantially as herein described.

5. As an improved article of manufacture, a fabric made water-proof, and subjected to the action of steam when the coating has dried, substantially as herein described.

ROBERT S. FORBES.

Witnesses:
OSCAR F. GUNZ,
C. SEDGWICK.